(12) United States Patent
Ben

(10) Patent No.: US 8,473,532 B1
(45) Date of Patent: Jun. 25, 2013

(54) METHOD AND APPARATUS FOR AUTOMATIC ORGANIZATION FOR COMPUTER FILES

(75) Inventor: Chee Hung Ben, Ruston, LA (US)

(73) Assignee: Louisiana Tech University Research Foundation, Ruston, LA (US)

( * ) Notice: Subject to any disclaimer, the term of this patent is extended or adjusted under 35 U.S.C. 154(b) by 2508 days.

(21) Appl. No.: 10/916,856

(22) Filed: Aug. 12, 2004

Related U.S. Application Data (60) Provisional application No. 60/494,510, filed on Aug. 12, 2003.

(51) Int. Cl.
G06F 12/00 (2006.01)

(52) U.S. Cl.
USPC ............... 707/829; 707/831; 707/694

(58) Field of Classification Search
USPC ...................... 707/829, 831, 694
See application file for complete search history.

(56) References Cited

U.S. PATENT DOCUMENTS

| | | | | |
|---|---|---|---|---|
| 5,619,709 A * | 4/1997 | Caid et al. | ............. | 715/532 |
| 5,832,470 A * | 11/1998 | Morita et al. | ............. | 707/1 |
| 5,873,056 A * | 2/1999 | Liddy et al. | ............. | 704/9 |
| 5,895,470 A * | 4/1999 | Pirolli et al. | ............. | 707/102 |
| 5,895,905 A * | 4/1999 | McVicar | ............. | 235/454 |
| 5,899,995 A * | 5/1999 | Millier et al. | ............. | 707/102 |
| 5,924,090 A | 7/1999 | Krellenstein | | |
| 6,078,924 A * | 6/2000 | Ainsbury et al. | ............. | 707/102 |
| 6,285,999 B1 | 9/2001 | Page | | |
| 6,349,294 B1 * | 2/2002 | Shaath et al. | ............. | 707/2 |
| 6,507,363 B1 * | 1/2003 | Anderson et al. | ............. | 348/231.9 |
| 6,859,455 B1 * | 2/2005 | Yazdani et al. | ............. | 370/392 |
| 6,912,550 B2 * | 6/2005 | Zhang et al. | ............. | 707/200 |
| 7,062,498 B2 * | 6/2006 | Al-Kofahi et al. | ............. | 707/101 |
| 7,085,771 B2 * | 8/2006 | Chung et al. | ............. | 707/102 |
| 7,158,962 B2 * | 1/2007 | Nelson | ............. | 707/101 |
| 2003/0033347 A1 * | 2/2003 | Bolle et al. | ............. | 709/107 |
| 2003/0061221 A1 * | 3/2003 | Ito et al. | ............. | 707/100 |
| 2003/0061229 A1 * | 3/2003 | Lusen et al. | ............. | 707/102 |
| 2003/0088557 A1 * | 5/2003 | Morino | ............. | 707/3 |
| 2003/0097353 A1 * | 5/2003 | Gutta et al. | ............. | 707/1 |
| 2004/0215597 A1 * | 10/2004 | Fitzgerald et al. | ............. | 707/1 |
| 2006/0010145 A1 * | 1/2006 | Al-Kofahi et al. | ............. | 707/100 |

OTHER PUBLICATIONS

Craven, P., webpage from www.webworkshop.net/pagerank.html date unknown.

* cited by examiner

*Primary Examiner* — Pierre Vital
*Assistant Examiner* — Christopher J Raab
(74) *Attorney, Agent, or Firm* — Jones Walker LLP (57) ABSTRACT

A method and apparatus to automatically organize computer files or web pages into meaning categories, to acquire new computer files or web pages, and to maintain the resulting organization in hierarchical directory tree structure. The method allows a user to provide a large number of unorganized files or an initial directory. The method partitions the unorganized files into hierarchically arranged categories that form an initial directory or allows a user to provide the initial directory. The method creates a description to summarize the contents of each of the categories in the directory. The method uses the descriptions in a classification step that assigns a newly given computer file to one of the categories. When the number of files in a category exceeds a user predefined limit, the method partitions some of the files into additional categories. The method updates the descriptions of a category and all its parent categories whenever additional files or categories are added into or removed from the category.

25 Claims, 3 Drawing Sheets

Data Flow Diagram Highlighting the Processes of the Invention

Figure 1

Figure 2. Data Flow Diagram Highlighting the Processes of the Invention

Figure 3

METHOD AND APPARATUS FOR AUTOMATIC ORGANIZATION FOR COMPUTER FILES

This application claims the benefit under 35 USC 119(e) to U.S. Provisional Application No. 60/494,510, filed Aug. 12, 2003, which is incorporated by reference herein in its entirety.

FIELD OF THE INVENTION

The present invention relates generally to methods and apparatus for automatically organizing computer files into meaningful categories. In particular, the present invention relates to automatically organizing files or sub-folders into familiar folders in a directory tree.

BACKGROUND OF INVENTION

The internet contains vast numbers of web pages stored in computer files located all over the world. More and more files are constantly being created and placed on the internet. The vast number of internet files and the speed in which the internet is growing make it impossible to use human labor to classify and organize those files into meaningful categories. Yet there currently exists no system that will automatically analyze web pages or computer files and arrange them into meaningful categories that will facilitate the retrieval of relevant information from the internet or intranets.

Yahoo (www.yahoo.com) is a popular search engine that manually classifies web pages into subjects (such as, Arts & Humanities, Business & Economy, Computers & Internet, and Education, each of which is further classified into subcategories, thereby forming a directory structure). The manual classification process usually begins with users who submit suggested subjects for their web sites or web pages. The sites are then placed in categories by people (called Surfers) who visit and evaluate the suggestions and decide where they best belong. By using this manual process, Yahoo ensures the classification is done in the best humanly possible way. However, since the manual process is labor intensive and relatively slow compared to the rapid growth of web pages, Yahoo can now only classify a small percentage of web pages (estimated to be less than 10%). This manual process simply cannot keep up with the explosive growth of the web. Thus, the percentage of manually classified web pages is estimated to be getting smaller and smaller.

Most search engines (such as, AltaVista, Excite, Go (formerly Infoseek), DirectHit, Google, and Lycos) do not provide classification of web pages (or only rudimentary manual grouping of a small number of pages). With the exception of DirectHit, these search engines rank search results based on factors such as the location of the keywords and the number of occurrences of the keywords. For example, if the keywords are located in the title of a web page, then the web page is ranked higher than other web pages that contain the same keywords in the body.

DirectHit (www.directhit.com), on the other hand, ranks search results based on the usage history of millions of Internet searchers. This ranking is based on a number of usage factors, such as the number of users who select a web page and the amount of time the users spend at the web page. By presenting the higher ranked pages first, one can see and find the most popular pages or sites.

Northern Light (www.northernlight.com) is one of the first search engines to incorporate automatic web-page classification. Northern Light organizes search results into categories by subject, type, source, and language. The categories are arranged into hierarchical folders much like a directory structure. The arrangements and the choices of the categories are unique to each search and generated based on the results of the search.

The automated categorization of web documents has been investigated for many years. For example, Northern Light received U.S. Pat. No. 5,924,090 for their classification mechanisms. Mladenic (1998) (citations for all references given herein are provided at the end of this specification) has investigated the automatic construction of web directories, such as Yahoo. In a similar application, Craven et al. (1998) applied first-order inductive learning techniques to automatically populate an ontology of classes and relations of interests to users. Pazzani and Billsus (1997) apply Bayesian classifiers to the creation and revision of user profiles. WebWather (Joachims et al., 1997) performs as a learning apprentice that perceives a user's actions when browsing on the Internet, and learns to rate links on the basis of the current page and the user's interests. For the techniques of construction of web page classifiers, several solutions have been proposed in the literature, such as Bayesian classifiers (Pazzani & Billsus, 1997), decision trees (Apte et al., 1994), adaptations of Rocchios algorithm to text categorization (Ittner et al., 1995), and k-nearest neighbor (Masand et al., 1992). An empirical comparison of these techniques has been performed by Pazzani and Billsus (1997). The conclusion was that the Bayesian approach leads to performances at least as good as the other approaches.

The prior art also includes methods of text learning and document classification. Text learning techniques are used to extract key information from documents. The extracted information is used to represent a document or a category. To represent (or to describe) a document or a category in a concise way, text learning techniques are used to abstract key information from the documents. A simple but limited document representation (or description) is the bag-of-words technique (Koller 1998, Lang 1995). To represent a given document, the technique simply extracts key words from the document and uses those words as the representation of that document. To make the representation concise, many common words (also called stop words), such as pronouns, conjunctions and articles, are not included in the representation.

Various derivatives from the bag-of-words technique have also been proposed. For example, Mladenic (1998) extends the bag-of-words concept to a bag-of-phrases, which was shown by Chan (1999) to be a better choice than using single words. Experiments have shown that a phrase consisting of two to three words is sufficient in most classification systems.

Another extension of this concept is to associate each phase (or term) with a weight that indicates the number of occurrences of that phase in the document (Salton 1987). To increase the accuracy of counting the occurrences, many forms of a word, such as plural or past tense of a word, are considered the same as the original word, which is done by using a process called "stemming." Each phase together with its associated weight is considered as a feature of the document. All the extracted features of a document are grouped to form a vector called a "feature vector" representation of that document.

Figure 1:
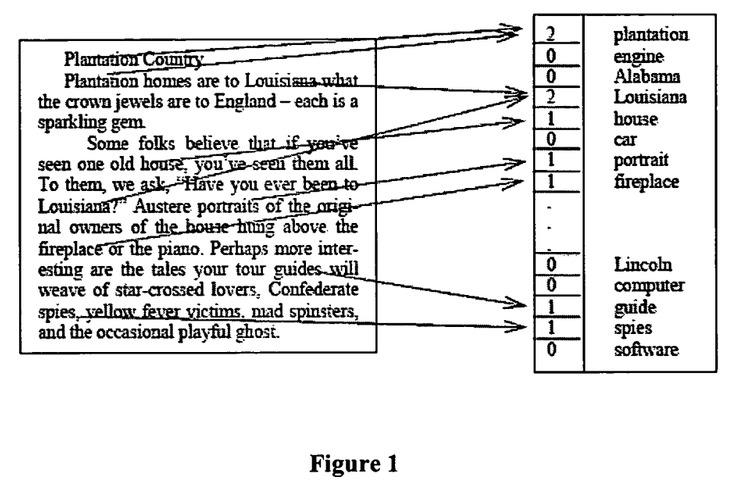
FIG. 1 is a representation of extracting features from a text document.

As an example, assume the block of text seen in the left in FIG. 1 represents a' text file. The chart to the right in FIG. 1 represents the number of occurrences of particular words in the text. One possible way to form a feature vector representing this text would be to list the number of occurrences of each key (i.e., uncommon) word. However, because of the large number of different words appearing in an average text document, typically only a limited number of the most frequently used words will be selected as features. Thus, if the features chosen to represent the document in FIG. 1 were "plantation", "Louisiana", "house", portrait" and "fireplace", the feature vector could be represented as (2, 2, 1, 1, 1). It is also typical to normalize the feature values, for example, by dividing each feature value by the sum of the feature values (in this case 7), thus giving the example feature vector as (0.29, 0.29, 0.14, 0.14, 0.14). Obtaining a feature vector representative of multiple files is accomplished by a normalized sum of the individual feature vectors, e.g., let C be the normalized sum of vectors A and B, then $$C_i = \frac{A_i + B_i}{\sum (A_i + B_i)} \quad (1)$$

Likewise, the similarity of vectors A and B may be determined by their dot product or $$\frac{\sum (A_i \times B_i)}{|A| \times |B|} \quad (2)$$

While a text file was given as the preceding example, it will of course be understood that a feature vector could represent a webpage or any other electronic document or item of information.

One way to represent a category or a folder representing many files is by using the similar vector representation as described above for documents. In this case, a set of training documents for a category is provided. Text learning techniques extract the common terms among the documents and use those terms to form a vector representation of the category. One such technique is called Term Frequency Inverse Document Frequency (TFIDF) (Salton 1987). TFIDF representation extends the feature vector concept further to account for the number of occurrences of a term in all training documents. It represents each category as a vector of terms that are abstracted from all training documents. Each training document Dj is represented by a vector Vj and each element of the vector Vj is a product of the term frequency TF(Wi, Dj) and the inverse document frequency IDF (Wi), where TF(Wi, Dj) is the number of occurrences of the term Wi in the document Dj. IDF(Wi) is the product of the total number of training documents T and the inverse of DF(Wi) is the number of documents containing the term Wi. That is:

$$IDF(Wi) = \frac{T}{DF(Wi)}$$

Log(T/DF(Wi)) is often used instead of the simple product. A single vector is formed by combining all the vectors Vj where j ranges 1 to T. Each element of the single vector is the average value of all the corresponding elements in Vj (j from 1 to T). Other more sophisticated techniques are available such as PrTFIDF (Joachims 1997). Joachims extended the TFIDF representation into probabilistic setting by combining probabilistic techniques into the simple TFIDF.

Once each category is represented by a vector and a document is also represented by a vector, classifying the document is done by comparing the vector of the document to the vector of each category. The dot product (equation 2) between the vectors is usually used in the comparison. The result of the dot product is a value which is used to measure the similarity between the document and a category. The document is assigned to the category that results in the highest similarity among all the categories. Other more sophisticated classification algorithms and models were proposed including: multivariate regression models (Fuhr 1991, Schutze 1995), nearest neighbor classifiers (Yang 1997), Bayesian classifiers (Lewis 1994), decision tree (Lewis 1994), Support Vector Machines (Dumais 2000, Joachims 1998), and voted classification (Weiss 1999). Tree structures appear in all of these systems. Some proposed systems focus on classification algorithms to improve the accuracy of assigning documents to catalogs (Joachims 1997), while others take the classification structure into account (Koller 1998). Nevertheless, there are many improvements which are still needed in conventional classification systems.

SUMMARY OF INVENTION

One embodiment of the present invention provides a method for automatically organizing computer files into folders. The method includes the steps of: (a) arranging computer files to form an initial directory of folders; (b) creating a description of each of the folders based upon the content of the folders; (c) assigning a new computer file to one of the folders; and (d) automatically creating an additional folder.

Another embodiment provides a method for automatically organizing computer files into folders. The method includes the steps of: (a) providing a directory of folders, wherein substantially each of the folders is represented by a description; (b) providing a new computer file not having a location in said directory, where the computer file is also represented by a description; (c) comparing the description of the computer file to descriptions of a plurality of the folders; and (d) assigning the computer file to the folder having the most similar description.

DETAILED DESCRIPTION OF INVENTION

Figure 2:
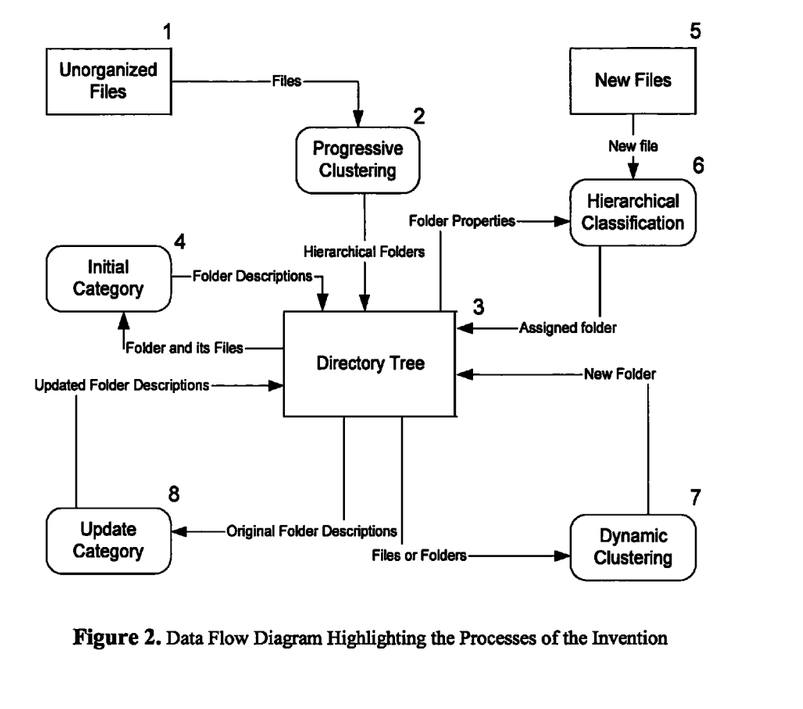
FIG. 2 is a schematic illustration of the overall operation of the present invention.

The present invention provides a method and apparatus to automatically organize computer files or web pages into meaningful categories, to acquire new computer files or web pages, and to maintain the resulting organization in a hierarchical directory tree structure. In one preferred embodiment, the invention consists of five processes (as shown in FIG. 2): Progressive Clustering 2, Initial Category 4, Hierarchical Classification 6, Dynamic Clustering 7, and Update Category 8. The embodiment also allows a user to implement the invention with a large number of initially unorganized files 1 or an existing initial Directory Tree 3.

As a general overview of the illustrated embodiment, when Unorganized Files 1 are given, Progressive Clustering process 2 partitions a group of unorganized files into hierarchically arranged categories that form an initial Directory Tree 3. This process is skipped when user provides the initial Directory Tree 3. Initial Category process 4 will then take the initial Directory Tree 3 and create a Folder Description that is an encoding to summarize the contents of each of the categories or folders in the directory. Hierarchical Classification process 6 takes a new file 5 and searches the descriptions of certain categories to find the most appropriate category for placing the file. When the number of files or folders in a category exceeds a user predefined limit, Dynamic Clustering process 7 partitions some of the files or folders into additional categories that are stored as folders in the Directory Tree (3). Update Category process (8) will then update the descriptions of a category and all its parent categories whenever files or folders are added into or removed from a category.

Several terms as used herein are intended to have their broadest definitions. The term "category" means any class or division of a classification scheme into which electronic information may be divided. "File" may mean any electronic document, website, or other discernable division of electronic data or information. "Folder" includes any collection of files, any list of files in a database, or any place holder for files. The term "folder" also encompasses categories, where a category may be represented as a folder. A "folder" may be a "root" folder, i.e., the highest level folder or may be a "leaf" folder, i.e., the lowest level folder containing only files. A "sub-folder" is any folder contained in a higher level folder. While leaf folders will normally contain most files, it will be quite common for a higher lever folder to contain both sub-folders and individual files. The main process of operations of the disclosed embodiment is outlined in the following pseudo-code. It will be understood that text after the double slash (//) symbol are comments.

//**********
Main Process
   If a large number Unorganized Files is given
   Call Progressive Clustering process
   // to organize the files into Hierarchical Folders
   // to create a new Directory Tree
   Call Initial Category process
   // to generate a description for each folder
   If an existing Directory Tree is given
   Call Initial Category process
   // to generate a description for each folder
   If a New Files is given
   Call Hierarchical Classification process
   // to assign a folder for the new file
   If a file or a folder is added into or deleted from a folder
   Call Update Category process
   // to update the description of the folders from current folder to the root folder
   If the number of files or folders in a folder exceed a given limit
   Call Dynamic Clustering process
   // to create a new folder for grouping some of the files or folders
//********

Progressive Clustering process 2 takes Unorganized Files 1 and partitions the files into hierarchically arranged categories (folders) that form an initial Directory Tree 3. The process of operation is outlined in the following pseudo-code.

//********************
Progressive Clustering Process
   While the number of files or folders in the current folder exceeds a limit
   Call Dynamic Clustering process
   // to group some of the files or folders into a new folder
   Call Progressive Clustering process with remaining files or folders
   // to recursively cluster the new folder
//*********

Progressive Clustering process 2 can be used to cluster files or folders. It will continue recursively clustering files or folders into new folders while the number of files or folders in the current folder exceeds a user defined limit. The clustering step is preformed by calling Dynamic Clustering process 7 which is explained below. A new folder will contain some of the files or folders from the current folder which have a requisite degree of similarity and the remaining files or folders in the current folder are passed again recursively to the Progressive Clustering process 2. The recursive steps will stop when the number of files or folders in the current folder does not exceed the limit. When the Progressive Clustering process 2 is used to cluster folders, it will organize some of the folders and put them under a new folder, thus creating a hierarchy of folders in which some folders contain other folders. The resultant hierarchy of folders forms a Directory Tree 3.

Initial Category process 4 will then take the initial Directory Tree 3 and create a Folder Description that is a description or encoding summarizing the contents of each of the categories (folders) in the directory. The description of each folder is used in Hierarchical Classification process 6 for classifying new files into one of the folders in the Directory Tree 3. The process of operation is outlined in the following pseudo-code.

//*****************
Initial Category Process
   For each folder contained in the current folder
   Call Initial Category process with the contained folder
   // to generate a description of the folder
   Add the resulting description into the description of the current folder
   For each file contained in the current folder
   Generate a description for the file
   Add the resulting description into the description of the current folder
//*********

Initial Category process 4 recursively creates a description for each folder in the directory tree 3. A description of a folder is generated by combining the description of each of its files and each of its folders. A description of a file or a folder is usually encoded in the form of a feature vector as discussed in the Background of Invention section. The addition of two descriptions is preformed by adding two vectors as also discussed above. The recursive steps will stop when the process completes all the folders contained in the directory tree. It will be understood that a folder's feature vector will generally contain all the features of the combined files in that folder. For example, if the feature vector (V) of files A and B contains the features ($w_i$) such that $V_{FileA}=(w_1, w_2, w_3, 0, 0, 0)$ and $V_{FileB}=(0, 0, 0, w_3, w_a, w_5)$, the feature vector of the folder containing files A and B would be $V_{Folder}=(w_1, w_2, w_3, w_4, w_5)$.

Figure 3:
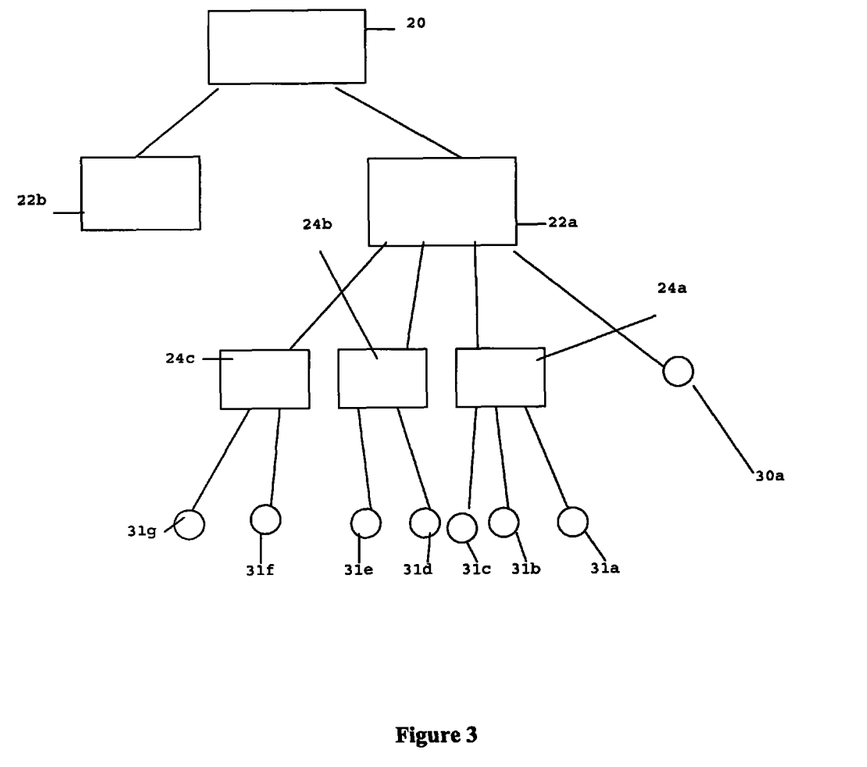
FIG. 3 is a schematic illustration a directory tree.

As a further example, FIG. 3 illustrates a highly simplified directory tree 3. Root folder 20 contains folders 22a and 22b. Folder 22a contains leaf folders 24a-24c and the file 30a. Leaf folders 24a-24c contains files 31a-31g.

Since Initial Category process is a recursive process, the "Call Initial Category" step will be executed with each folder down the length of directory tree 3 until the process reaches folders that contain no sub-folders, i.e. leaf folders 24a-24c. The process will then obtain a feature vector for each of folders 24a, 22b, and 24c by summing the feature vectors of files 31a-31c, 31d-31e, and 31f-31g respectively. Thereafter, a feature vector is generated for folder 22a by summing the feature vectors of folders 24a-24c together with the feature vector of file 30a. Typically, the addition of folder feature vectors and file feature vectors will be carried out with some type of normalization method. For example, if the feature vectors for folders 22a, 24a, 24b, and 24c are $V_{22a}$, $V_{24a}$, $2V_{24b}$, $2V_{24c}$, and the feature vector for file 30a is $V_{30a}$, then one normalized addition process for adding the folders and file would be:

$$V_{22a}=(3V_{24a}+2V_{24b}+2V_{24c}+V_{30a})/|(3V_{24a}+2V_{24b}+2V_{24c}+V_{30a})|. \quad (3)$$

Once the feature vector for folder 22a is determined, the feature vectors for 22a and 22b are summed to give the feature vector for folder 20.

Hierarchical Classification process 6 takes a new file 5 and searches the descriptions of certain folders to find the most appropriate folder for the file. The process of operation is outlined in the following pseudo-code.

//***************************

Hierarchical Classification Process
   Generate a description for the new file
   Let max be the similarity
   between the description of the file and that of the root folder
   Let best folder be the root folder
   Let current folder be the root folder
   While current folder contains folders
   Select the folder that has the maximum similarity to the file
   // among the contained folders
   If the maximum similarity is larger than max
     Let max be the maximum similarity
     Let best folder be the selected folder
   Let current folder be the selected folder
   // for continuing the search
   Put the new file into the resulting best folder
//**************

Hierarchical Classification process 6 first generates a description (a feature vector) for the new file 5. It then searches in the directory tree 3 for the most appropriate folder to which to assign the file. The most appropriate folder is the one that is most similar to the file. Similarity between two files or between a file and a folder is usually calculated using the dot product (equation 2) between two feature vectors. The search process starts at the root of the directory tree. From the root folder, it chooses the folder with the most similar feature vector to move downward toward. From the chosen folder it again chooses a folder to move downward, and so on until reaching a folder that does not contain any folder (i.e., a leaf folder). Along the search path from the root to a leaf folder, the process finds a folder that has the maximum similarity to the file. The new file is then classified and put into that folder.

Thus viewing FIG. 3 as an example, it can be understood how Hierarchical Classification process 6 will compare the feature vector of new file 5 with the feature vector of root folder 20 (e.g. by a dot product operation) and let that value be the initial similarity threshold. The process will then determine which of folds 22b and 22a has a feature vector with the maximum similarity to that of new file 5. If the feature vector of folder 22a is more similar, then folder 22a will become the current folder being analyzed. This process is then repeated for folders 24a-24c to select the folder with the maximum similarity to new file 5. If folders 24c has the maximum similarity along folders 24a-24c, then 24c is selected for consideration. In this example, folder 20, 22a, and 24c, are each the folders having the maximum similarity in their level along the path from root to leaf folder and are the folders selected for consideration. Among these three folders, the one having the maximum similarity value is chosen as the folder in which to place the new file.

Dynamic Clustering process 7 partitions certain files or folders into additional categories that are stored as folders in the directory tree 3. Dynamic Clustering process can be used to group either files or folders into an additional folder(s). The process of operation is outlined in the following pseudo-code.

//********************

Dynamic Clustering process
   Let n be the number of items // which can be files or folders but not both
   Compare each pair of items to get a similarity number
   Store all similarity numbers in an n*n matrix
   Determine a similarity threshold from the matrix
   // Partitioning Cluster method begin
   Let current group be the group all n items
   Let increasing be false and let decreasing be false
   Create a queue
   Repeat until a new folder is created or cannot cluster
     Let group too large be false
     While the number of items in current group is larger than a min limit
       Let found be true
       For each pair (j, k) of items in the current group
         If the similarity of the pair is less than the threshold
           Split the group into two groups
           // one excluding j and the other excluding k
           Append the two groups into the queue
           Let found be false
           Break // the for loop
       If not found
         Remove the first item from the queue and assign it to current group
         Continue // checking the new current group
       Else // found
         If the number of items in the current group is larger than
         (n – min limit)
           Let group too large be true and found be false
           Remove the first item from the queue and assign it to current group
           Continue // checking the new current group
         Else // found the right size
           Break // the while loop
     If found
       Create a new folder to contain the items of the current group
       Return the new folder // done
     Else If group too large and not decreasing
       Let increasing be true
       Increase the threshold by a factor
       Let group too large be false
       Let current group be the group of all n items
       Continue // all over with the new threshold
     Else If not increasing
       Let decreasing be true
       Decrease the threshold by a factor
       Let current group be the group of all n items
       Continue // all over with the new threshold
     Else // cannot be clustered with the current limit
       Return // no new folder created
//**************

The process starts by identifying the total number of items "n" (files or folders) to be clustered. It compares each pair of items to determine how similar the pairs of items are. Similarity between two items is usually computed by using dot product between two vectors as discussed in Background of Invention section. The results of these comparisons are stored in a matrix for use in later steps. Based on the results, the process then determines a threshold in any conventional manner such as by taking the average similarity, the median or another percentile as the threshold. The process clusters files by partitioning the n given items into smaller and smaller groups. It starts with the n items as the initial group. It compares each pair of items in the group. If a pair (j, k) of items in the group have a similarity less than the threshold, then it splits the group into two groups; one containing all items excluding j and the other containing all items excluding k. Then, the process places the new groups into a queue and continues checking the two newly created groups. The process is continued in an iterative manner until a group is found wherein all pairs of items have a similarity larger than the threshold.

To prevent a resulting group to be too small or two large, a user could provide a minimum limit (the variable "min limit" noted in the pseudo code is predefined or set by the user outside the Dynamic Clustering routine). A group is considered too small if the number of items in the group is less than the minimum limit. It is considered too large if the number of items in the group is larger than n minus the minimum limit. The limit is use to dynamically adjust the threshold such that the process will produce a group that is within the desired size. As shown in the pseudo code, the threshold is increased if all resulting groups are too large and is decreased if all resulting groups are too small. To prevent oscillation, after trying to increase the threshold, the process will not then decrease the threshold and likewise, after trying to decrease the threshold, the process will not increase it. If a group within the right size can be found, the process will create a new folder to hold the items in the group and return the new folder. Otherwise, no new folder is created.

When a new folder is created, it will generally be advantageous to label or name the new folder to assist the user in identifying the folder in the directory. Those skilled in the programming art will recognize that there are many conventional ways of assigning a name to a folder. In one embodiment of the present invention, the new folder could be labeled with a few of the most frequently appearing terms from the files contained in the folder. Naturally, many other conventional manners of automatically labeling or naming folders are considered within the scope of the present invention.

Update Category process 8 will update the descriptions of a category or folder and all its parent folders whenever files or folders are added into or removed from a folder. The process of operation is outlined in the following pseudo-code.

//******************

Update Category Process
   If a new file is added into the current folder
     Add the description of the file into the description of the current folder
   If a file is deleted from the current folder
     Recreate a description of the current folder
     by combining all the description of its remaining files and its folders
   If a new folder is added into the current folder
     Create a description of the new folder
     by combining all the description of its files and its folders
     Recreate a description of the current folder
     by combining all the description of its files and its folders
   If a folder is deleted from the current folder
     Recreate a description of the current folder
     by combining all the description of its files and its remaining folders
   While the current folder is not the root folder
     Update the description of the parent folder of current folder
     by recreating the description of the parent folder to account for the updated description
     Let current folder be the parent folder
     // to continue propagating the update upward to the root folder

//**************

Update Category process 8 adds the description of a newly created file into the description of the folder which is to contain the file as described above. This is done by adding the feature vector for representing the file and the feature vector for representing the folder. If a file is removed from a folder, then the description of the folder is recreated using the remaining files and folders. If a new folder is created, then a description for the new folder is generated by adding the descriptions of all its files and its folders. If the new folder is put into or removed from the current folder, then the description of the current folder is recreated using all its files and folders. Since the description of a folder depends on the descriptions of all the folders contained in it, the update needs to be propagated upward from the folder to its parent folder and so on until the root folder is reached. This hierarchical arrangement of descriptions enables Hierarchical Classification process to search a single path from root to a leaf folder to find the most appropriate category for classifying a new file.

It can be seen how the foregoing description discloses a novel and advantageous method of organizing computer files. The method can be applied to existing directory trees to help users organize their files. The method can also be applied to the Internet to organize the vast web pages into meaningful categories. The classification aspects of the method offer further advantages by allowing the dynamic expansion of the classification structure. At least one embodiment of the automatic organization system, unlike the prior art, stresses the dynamic growing issue of the Internet/Intranet. As the number of web pages or files on the Internet/Intranet increases continuously in great speed, it is impossible for a prior art fixed category system to provide accurate classification. The disclosed dynamic-category expansion method has the functionality of adding new categories automatically to accord for the growth of the Internet/Intranet.

Additionally, the embodiment of the single-path search algorithm takes advantage of the hierarchical structure of the classification system and results in improving the classification accuracy and also in greatly reducing the computational complexity. When classifying a new web page, the single-path algorithm searches a path from the root to a leaf of the classification tree. This increases the accuracy of classification by 6% and reduces the computational complexity from $\theta(n)$ to $\theta(\log(n))$ in comparison to typical prior art classification methods.

Of course, the above description discloses but one embodiment of the present invention. Many modifications to the invention could be made and it is understood that the term "computer files" includes files store on the Internet or an intranet, files used as web pages or used as documents. The term "category" includes folders in a directory structure of an operating system (such as file directory of MS-DOS). The term "new file" could be a newly created file or a file associated with a newly found URL link. The term computer as used herein is intended to include PALM-like devices, PDAs, or any other electronic device having a processor and operating on a set of software instructions. Those skilled in the art will recognize that all of these variations and/or modifications could be made without departing from the basic inventive concept. All such variations and/or modifications are intended to come with in the scope of the following claims.

REFERENCES

Each of the following references is incorporated by reference into this application in their entirety.

Apte, C., F. Damerau, & S. M. Weiss (1994). *Automated learning of decision rules for text categorization. ACM Trans. on Information Systems,* 12(3), pp. 223-251.

Chan, Philip K., "A non-invasive learning approach to building web user profiles", KDD-99 Workshop on Web Usage Analysis and User Profiling, 1999.

Craven, M., S. Slattert, & K. Nigam (1998). *First-order learning for web mining. Lecture Notes in Artificial Intelligence,* 1398, pp. 250-255, Springer: Berlin.

Dumais, Susan, Hao Chen, "Hierarchical Classification of Web Content". Proceedings of SIGIR-00, 23rd ACM International Conference on Research and Development in Information Retrieval, 2000.

Fuhr, N., S. Hartmanna, G. Lustig, M. Schwantner, and K. Tzeras, "A rule-based multi-stage indexing system for large subject fields", Proceedings of RIAO'91, 06-623, 1991.

Ittner, D., D. Lewis, & D. Ahn (1995). *Text categorization of low quality images. Symposium on Document Analysis and Information Retrieval*, pp. 301-515.

Joachims, T. (1997). A probabilistic analysis of the Rocchio algorithm with TFIDF for text categorization. *Proc. of the 14th International Conference on Machine Learning*, pp. 143-151.

Joachims, Thorsten, "Text categorization with support vector machines: Learning with many relevant features", Proc. 10th European Conference on Machine Learning (ECML), Springer Verlag, 1998.

Joachims, Thorsten. "A probabilistic analysis of the Rocchio algorithm with TFIDF for text categorization", In International Conference on Machine Learning (ICML), 1997.

Koller, D. and M. Sahami, "Hierarchically classifying documents using very few words", Proceedings of the 14th international Conference on Machine Learning ECML98, 1998.

Lang, K., "Newsweeder: Learning to filter news", In Proceedings of the 12th International Conference on Machine Learning, 331-339, 1995.

Lewis, D. D., and M. Ringuette, "A comparison of two learning algorithms for text categorization", Third Annual Symposium on Document Analysis and Information Retrieval (SDAIR'94), 81-93, 1994.

Massand, B., G. Linoff, & D. Waltz (1992). *Classifying new stories using memory based reasoning. Proceedings SIGIR '92*, pp. 59-65.

Mladenic, D. (1998). *Turning Yahoo into an automatic webpage classifier. In H. Parde (Ed.), Proc. 13th European Conference on Artificial Intelligence*, pp. 471-474, John Wiley & Sons: Chichester.

Mladenic, Dunja and Marko Grobelnik, "Word sequences as features in text-learning", In Proceedings of ERK-98, the Seventh Electro-technical and Computer Science Conference, 145-148, 1998.

Pazzani, M. & D. Billsus (1997). *Learning and revising user profiles: The identification of interesting web sites. Machine Learning Journal*, 23, pp. 313-331.

Salton, G., and C, Buckley, "Term Weighting Approaches in Automatic Text Retrieval", Technical Report, COR-87-881, Department of Computer Science, Cornell University, November, 1987.

Schutze, H., D. Hull, and O. J. Pedersen, "A comparison of classifiers and document representations for the routing problem", Proceedings of the 18th Annual International ACM SIGIR Conference on Research and Development in Information Retrieval, 229-237, 1995.

Weiss, S. M., C. Apte, F. Damerau, D. E. Johnson, F. J. Oles, T. Goets, and T. Hampp, "Maximizing text-mining performance", IEEE Intelligent Systems, 14(4), 63-69, 1999.

Yang, Y. and O. J. Pedersen, "A comparative Study of Feature Selection in Text Categorization", Proc. of the fifth International Conference on Machine Learning ICML97, 412-420, 1997.

The invention claimed is:

1. A method for automatically organizing computer files into folders, comprising the steps of:
   a. arranging computer files to form an initial directory of folders;
   b. creating a description of substantially each of said folders based upon contents of said folders;
   c. assigning a new computer file to a folder based upon said folder description, including searching for a similar folder description along a single path from a root folder to a leaf folder;
   d. automatically creating an additional folder if an existing folder contains a number of files or folders larger than a predefined limit; and
   e. placing at least one file or folder from said existing folder into said additional folder and retaining at least one file or folder in said existing folder.

2. The method for automatically organizing computer files according to claim 1, wherein said description of said folders includes a feature vector based upon a number of occurrences of a word in said folders.

3. The method for automatically organizing computer files according to claim 1, wherein said directory of folders is created by automatically clustering said computer files based upon a description of said computer files.

4. A method according to claim 3 further comprising comparing at least two computer files within a folder and splitting the two files into at least two folders based upon a threshold.

5. The method for automatically organizing computer files according to claim 3, wherein said description of said computer files is based upon a feature vector.

6. The method for automatically organizing computer files according to claim 3, wherein said automatic clustering of files is based upon a threshold and said threshold is dynamically adjusted.

7. The method for automatically organizing computer files according to claim 1, wherein said arranging of computer files to form an initial directory of folders comprises allowing a pre-existing directory of folders to be provided by a user.

8. The method for automatically organizing computer files according to claim 2, wherein a new file is assigned to a folder in said directory based upon a similarity of feature vectors between said new file and said folder.

9. The method for automatically organizing computer files according to claim 2, wherein a description of a folder is updated when a computer file is added or removed from said folder.

10. The method for automatically organizing computer files according to claim 1, wherein an updated description of a folder is propagated upward from a current folder to a root folder.

11. The method for automatically organizing computer files according to claim 1, wherein said folder description is created prior to adding said new file and said new file is a file not existing in said initial directory of folders.

12. The method for automatically organizing computer files according to claim 2, wherein said new computer file is assigned a name based upon features represented in said feature vector.

13. A computer system comprising a processor, memory, and software for automatically organizing computer files into folders, said software causing said computer system to execute the steps comprising:
   a. providing a directory of folders, wherein substantially each of said folders is represented by a description;
   b. providing a new computer file not having a location in said directory, said computer file being represented by a description;

c. comparing said description of said computer file to descriptions of a plurality of said folders along a single path from a root folder to a leaf folder; and d. assigning said computer file to a folder having the most similar description.

14. The computer system for automatically organizing computer files according to claim 13, wherein said description of said folders and said computer file is based upon a feature vector derived from respective contents of said folders and computer file.

15. The computer system for automatically organizing computer files according to claim 13, wherein substantially each computer file is assigned to a single folder in said directory of folders.

16. The computer system for automatically organizing computer files according to claim 13, wherein: (i) at least one additional folder is automatically created when a number of folders or computer files in an existing folder exceeds a user defined limit; (ii) at least one file or folder from said existing folder is placed into said additional folder; and (iii) at least one file or folder from said existing folder is retained in said existing folder.

17. A computer system comprising a processor, memory, and software for automatically organizing computer files into folders, said software causing said computer system to execute the steps comprising:
   a. providing a directory of folders, wherein substantially each of said folders is represented by a description;
   b. providing a new computer file not having a location in said directory, said computer file being represented by a description;
   c. comparing said description of said computer file to descriptions of a plurality of said folders;
   d. assigning said computer file to a folder having the most similar description;
   e. updating a description of a folder when said computer file is added or removed from said folder; and
   f. propagating an updated description of a folder upward from a current folder to a root folder.

18. The computer system for automatically organizing computer files according to claim 13, wherein said comparison of said descriptions of said computer files and said folders is made by determining the dot product of their respective feature vectors.

19. A method for hierarchically representing computer files and folders in a directory comprising the steps of:
   a. providing a pre-existing directory comprising a plurality of folders, at least one of said plurality of folders containing a plurality of sub-folders, and at least one of said plurality of sub-folders containing a plurality of computer files;
   b. creating a description for substantially each of said computer files in said sub-folders;
   c. combining substantially all of said descriptions for said computer files within a sub-folder in order to create a description of said sub-folder;
   d. combining substantially all of said descriptions for said sub-folders within a folder in order to create a description of said folder;
   e. wherein the combination of said descriptions for said computer files and said sub-folders includes searching for descriptions along a single path from a root folder to a leaf folder.

20. The method for hierarchically representing computer files and folders according to claim 19, wherein said description of said folders and said computer file is based upon a feature vector.

21. The method for automatically organizing computer files according to claim 1, wherein the computer file is a file on the Internet, an intranet, or a webpage.

22. The method for automatically organizing computer files according to claim 1, wherein a folder represents a category or set containing a listing of file, folder, or links.

23. A computer system having a processor, memory, and software causing said processor to execute the steps comprising:
   a. arranging computer files to form an initial directory of folders;
   b. creating a description of substantially each of said folders based upon a content of said folders;
   c. assigning a new computer file to a said folder, including searching for a similar folder description along a single path from a root folder to a leaf folder; and
   d. automatically creating an additional folder if any one of said folders contain a number of files or folders larger than a predefined limit.

24. The method for automatically organizing computer files according to claim 1, wherein said directory of folders is created by automatically clustering at least some of said folders based upon descriptions of said folders.

25. The computer system according to claim 23, further comprising the step of placing at least one file or folder from an existing folder into said additional folder and retaining at least one file or folder in said existing folder.

* * * * *

UNITED STATES PATENT AND TRADEMARK OFFICE
CERTIFICATE OF CORRECTION

| | | |
|---|---|---|
| PATENT NO. | : 8,473,532 B1 | Page 1 of 1 |
| APPLICATION NO. | : 10/916856 | |
| DATED | : June 25, 2013 | |
| INVENTOR(S) | : Choi | |

It is certified that error appears in the above-identified patent and that said Letters Patent is hereby corrected as shown below:

On Title page Item (12) delete "Ben" and insert --Choi--

On Title page Item (75) delete "Chee Hung Ben" and insert --Chee Hung Ben Choi--

Signed and Sealed this

Fourth Day of November, 2014

Michelle K. Lee
*Deputy Director of the United States Patent and Trademark Office*